United States Patent
Brahma et al.

(10) Patent No.: US 11,578,675 B2
(45) Date of Patent: Feb. 14, 2023

(54) INTERNAL COMBUSTION ENGINE CYLINDER AIR-FUEL RATIO IMBALANCE DETECTION AND CONTROLS

(71) Applicant: Cummins Inc., Columbus, IN (US)

(72) Inventors: Avra Brahma, Fishers, IN (US); Yongsoon Yoon, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 133 days.

(21) Appl. No.: 17/081,317

(22) Filed: Oct. 27, 2020

(65) Prior Publication Data

US 2021/0047975 A1 Feb. 18, 2021

Related U.S. Application Data

(60) Division of application No. 16/429,137, filed on Jun. 3, 2019, now Pat. No. 10,914,253, which is a continuation of application No. PCT/US2017/064010, filed on Nov. 30, 2017.

(60) Provisional application No. 62/428,656, filed on Dec. 1, 2016.

(51) Int. Cl.
*F02D 41/00* (2006.01)
*F02D 41/14* (2006.01)
*F02D 41/28* (2006.01)
*F02D 41/24* (2006.01)
*F02D 41/04* (2006.01)

(52) U.S. Cl.
CPC ..... *F02D 41/0085* (2013.01); *F02D 41/1456* (2013.01); *F02D 41/1495* (2013.01); *F02D 41/2458* (2013.01); *F02D 41/04* (2013.01); *F02D 2041/1423* (2013.01); *F02D 2041/288* (2013.01)

(58) Field of Classification Search
CPC ............. F02D 41/0085; F02D 41/1495; F02D 41/221456; F02D 41/2458; F02D 2041/286; F02D 2041/1423; Y02T 10/40
See application file for complete search history.

(56) References Cited

U.S. PATENT DOCUMENTS

| | | |
|---|---|---|
| 5,769,049 A | 6/1998 | Nytomt et al. |
| 6,668,812 B2 | 12/2003 | Javaherian |
| 7,027,910 B1 | 4/2006 | Javaherian |
| 9,057,337 B2 | 6/2015 | Sekiguchi et al. |
| 2009/0112446 A1 | 4/2009 | Richardson et al. |
| 2012/0277979 A1 | 11/2012 | Kato et al. |
| 2013/0047969 A1 | 2/2013 | Sekiguchi |
| 2013/0090834 A1 | 4/2013 | Miyauchi |
| 2013/0340512 A1 | 12/2013 | Beck |
| 2014/0290622 A1* | 10/2014 | Ikeda .................. F02D 41/0085 123/344 |

(Continued)

FOREIGN PATENT DOCUMENTS

WO 2008087111 7/2008

OTHER PUBLICATIONS

Search Report and Written Opinion, PCT Appln. No. PCT/US17/63940, dated Feb. 15, 2018, 10 pgs.

*Primary Examiner* — Phutthiwat Wongwian
*Assistant Examiner* — Arnold Castro
(74) *Attorney, Agent, or Firm* — Taft, Stettinius & Hollister LLP (57) ABSTRACT

A system for detecting and controlling air-fuel ratio imbalance conditions between cylinders of an internal combustion engine having a plurality of cylinders is disclosed.

15 Claims, 5 Drawing Sheets

(56) References Cited

U.S. PATENT DOCUMENTS

| | | |
|---|---|---|
| 2015/0260610 A1 | 9/2015 | Shiwa |
| 2015/0322880 A1 | 11/2015 | Winkler et al. |
| 2015/0345416 A1* | 12/2015 | Kappanganthu ...... G01M 15/00 73/114.38 |
| 2017/0241369 A1 | 8/2017 | Jammoussi |

* cited by examiner

INTERNAL COMBUSTION ENGINE CYLINDER AIR-FUEL RATIO IMBALANCE DETECTION AND CONTROLS

CROSS-REFERENCE TO RELATED APPLICATION

The present application is a divisional of U.S. application Ser. No. 16/429,137 filed Jun. 3, 2019 which is a continuation of International Patent Application No. PCT/US17/64010 filed on Nov. 30, 2017, which claims the benefit of the filing date of U.S. Provisional App. Ser. No. 62/428,656 filed on Dec. 1, 2016, the disclosures of which are incorporated herein by reference.

BACKGROUND

Internal combustion engines typically operate by introducing a mixture of air and fuel into a cylinder of an engine. A piston then compresses this mixture, and, depending on whether the engine is a compression ignition or spark ignition engine, the mixture combusts or is ignited in the cylinder. The ratio of air to fuel, or air-fuel ratio (AFR), in each cylinder during combustion is critical for engine performance and emissions control. For example, three-way catalysts deteriorate severely if the cylinder-to-cylinder AFR imbalance is present. Furthermore, having the same AFR between each cylinder of a plurality of cylinders is important in AFR control. Variations in AFR between cylinders, or cylinder imbalance, can result in higher emissions, higher fuel consumption, knock, and misfire, among other issues. Also, regulatory bodies are now requiring the detection of AFR imbalance as part of on-board diagnostic requirements. Therefore, further improvements in AFR imbalance diagnostics and/or controls of internal combustion engines are needed.

SUMMARY

One embodiment is a unique system for diagnosing and/or controlling AFR variation/imbalance between cylinders of an internal combustion engine having a plurality of cylinders. Other embodiments include unique methods, systems, and apparatus to determine an AFR imbalance among the plurality of cylinders. In a further embodiment, the AFR imbalance is determined based on a time domain frequency analysis, recursive non parametric spectral analysis, and/or a parametric spectral analysis using real time model identification.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
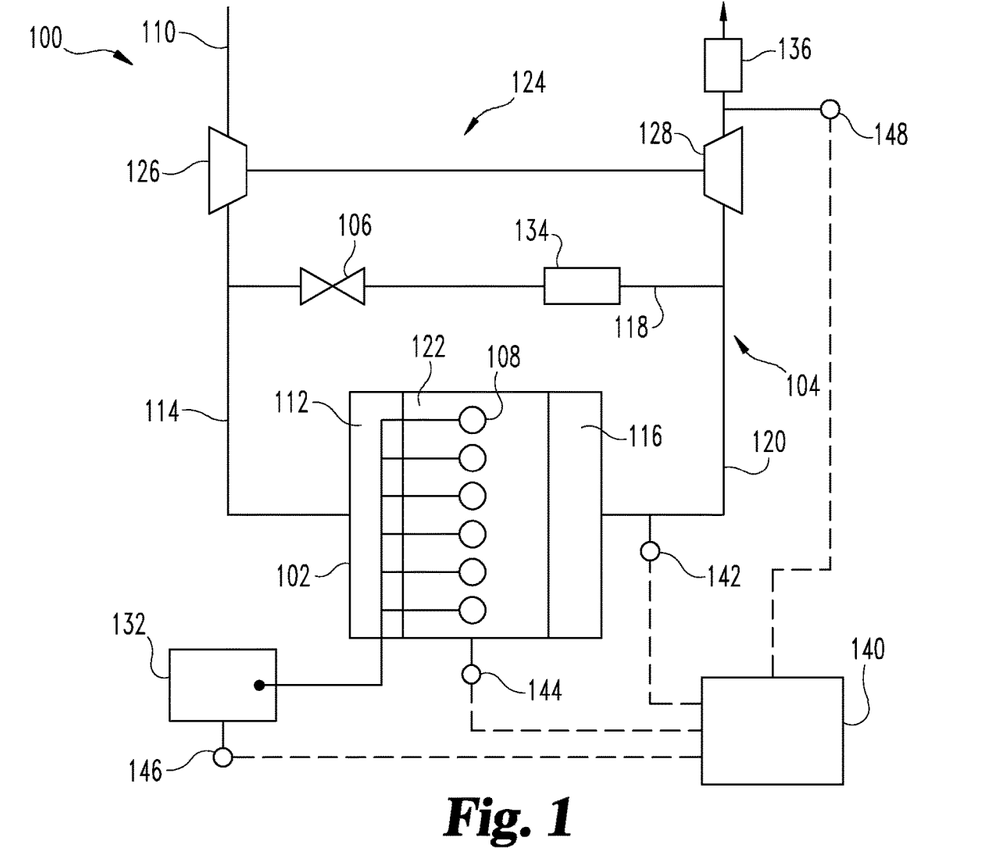
FIG. 1 is a schematic depiction of one embodiment of a system having an engine with an exhaust system, an intake system, an EGR system, a fuel system, a turbocharger system and a control apparatus.

Referencing FIG. 1, a system 100 is depicted having an engine 102 and an exhaust system 104. The engine 102 is an internal combustion engine of any type, and can include a stoichiometric engine, such as a natural gas engine, and/or a gasoline engine. In certain embodiments, the engine 102 is a combustion engine such as a natural gas engine, although embodiments with a gasoline engine, a diesel cycle engine, and combinations of these such as dual fuel engines are also contemplated. In certain embodiments, the engine 102 may be any engine type producing emissions that includes an exhaust gas recirculation (EGR) system 106, for example to reduce $NO_x$ emissions from the engine 102. The engine 102 includes a number of cylinders 108. The number of cylinders may be any number suitable for an engine, and the arrangement may be any suitable arrangement, such as an in-line or V-shaped arrangement. The system 100 includes an in-line six cylinder arrangement for illustration purposes only. The example engine 102 may further include an ignition source such as a spark plug (not shown) in certain embodiments.

In certain embodiments, the engine 102 is provided as a stoichiometric spark-ignition internal combustion engine, configured to develop mechanical power from internal combustion of a stoichiometric mixture of fuel and induction gas. As used herein, the phrase "induction gas" includes a charge flow, and may include fresh air, recirculated exhaust gases, or the like, or any combination thereof. The intake 110 includes an intake manifold 112 that receives charge flow from an intake passage 114 and distributes the induction gas to combustion chambers of cylinders 108 of the engine 102. Accordingly, an inlet of the intake manifold 112 is disposed downstream of an outlet of the intake passage 114, and an outlet of the intake manifold 112 is disposed upstream of an inlet of each of the combustion chambers in engine 102. An exhaust manifold 116 collects exhaust gases from combustion chambers of cylinders 108 of the engine 102 and conveys the exhaust gases to EGR passage 118 of EGR system 106 via exhaust passage 120. Accordingly, the inlet of the exhaust manifold 116 is disposed downstream of an outlet of each of the combustion chambers of the cylinders 108 in engine 102, and upstream of inlets to the respective EGR passage 118 and exhaust passage 120.

Injectors 122 may also be arranged within the engine 102 to deliver fuel directly or indirectly into the combustion chambers of cylinders 108 from a fuel system 130. In another embodiment, fuel is injected into the intake system upstream of the intake manifold 112, such as at the inlet of a compressor in the intake 110 or any other suitable location along intake passage 114. The fuel system 130 is structured to deliver fuel to the engine 102 in response to a fueling command that provides one or more of a fuel amount, timing, pressure and duration of fuel injection to each of the cylinders 108. The fuel system 130 includes a fuel source 132, such as a tank or pressurized supply of natural gas. In one embodiment, the fuel system 130 can be configured to deliver natural gas fuel to the engine 102 from fuel source 132. In another embodiment, the fuel system 130 can be configured to deliver another type of fuel, in addition to or in lieu of natural gas, to the engine 102. Examples of such additional fuels include gasoline, diesel, ethanol, and the like. In one embodiment, the fuel system 130 may include one or more injectors configured to inject fuel into the engine 102 so that it may be combusted within a combustion chamber. Example injectors include direct injectors, port injectors, and/or fuel valves that inject into intake passage 114.

In the EGR system 106 of FIG. 1, the EGR flow is created by exhaust gas that recirculates in EGR passage 118 and combines with fresh air flow in intake passage 114 at a position upstream of intake manifold 112. Intake manifold 112 provides a charge flow including the intake flow combined with the flow to each cylinder 108. Intake passage 114 can includes an intake throttle (not shown) to regulate the charge flow to cylinders 108. Intake passage 114 may also include a charge air cooler (not shown) to cool the charge flow provided to intake manifold 112. Intake passage 114 can also receive a compressed fresh air flow from a compressor 126 of a turbocharger 124. Intake passage 114 can also include a mixer to mix air, gaseous fuel, and EGR for delivery into the intake manifold. Turbocharger 124 also includes a turbine 128 in exhaust passage 120. Turbine 128 is operable via the exhaust gases to drive compressor 126 via a rod, shaft or the like. Turbine 128 can be a fixed geometry turbine, a variable geometry turbine with an adjustable inlet, or include a wastegate to bypass exhaust flow. It will be appreciated, however, that the turbocharger may be provided in any other suitable manner (e.g., as a multi-stage turbocharger, or the like), and may be provided with or without a wastegate and/or bypass. Other embodiments contemplate an exhaust throttle (not shown) in the exhaust system 104.

The EGR system 106 in the illustrated embodiment is a high pressure EGR system connected downstream of compressor 126 and upstream of turbine 128. Other embodiments contemplated low pressure EGR systems connected upstream of compressor 126 and downstream of turbine 128, combined low pressure and high pressure EGR systems, and dedicated EGR systems, for example. The example EGR system 106 includes an EGR cooler 134 in the EGR passage 118. In other embodiments, EGR passage 118 can include a bypass with a valve that selectively allows EGR flow to bypass the EGR cooler 134. The presence of an EGR cooler 134 and/or an EGR cooler bypass is optional and non-limiting. In certain embodiments, the system 100 does not include a compressor or any other type of boost pressure generating device in the intake 110.

The exhaust system 104 can further include an aftertreatment system 136 in exhaust passage 120 downstream of turbine 128 that is configured to treat emissions in the exhaust gas. Aftertreatment system 136 can include any aftertreatment components known in the art. Example aftertreatment components treat carbon monoxide (CO), unburned hydrocarbons (HC), nitrogen oxides ($NO_x$), volatile organic compounds (VOC), and/or particulate matter (PM). Aftertreatment system 138 can include a catalyst such as a three-way catalyst, a particulate filter, or any suitable emissions reduction or treating component.

In certain embodiments, the system 100 includes a controller 140 structured to perform certain operations to control operations of engine 102 and associated fuel system 130. In certain embodiments, the controller 140 forms a portion of a processing subsystem including one or more computing devices having memory, processing, and communication hardware. The controller 140 may be a single device or a distributed device, and the functions of the controller 140 may be performed by hardware or by instructions encoded on computer readable medium. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements. In the illustrated embodiment, controller 140 is connected to oxygen sensor(s) 142, engine sensor(s) 144, fuel sensor(s) 146, and exhaust sensor(s) 148 as discussed further below.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Example parameters related to the operation of the engine 102 determined by sensors 142, 144, 146, 148 which can be real or virtual, include any engine operating parameters that affect or can be correlated to the combustion conditions of cylinders 108, such as the fresh air (intake) mass flow, charge mass flow, and/or EGR mass flow. In some embodiments, one or more of oxygen sensors 142, 148 are oxygen sensors such as universal exhaust gas oxygen (UEGO) or heated exhaust gas oxygen (HEGO) sensors, and engine sensor(s) 144 measure a crank angle position of engine 102. Further example and non-limiting parameters related to the operation of the engine 102 measured by engine sensor(s) 144 can include an induction gas temperature at the intake passage 114, an induction gas temperature at the intake manifold 112, an induction gas pressure at the intake manifold 112, an exhaust gas temperature at the exhaust manifold 116, an exhaust gas pressure at the exhaust manifold 116, an exhaust gas temperature at the inlet and/or outlet of the exhaust passage 120, an exhaust gas pressure at the inlet and/or outlet of the exhaust passage 120, an exhaust gas temperature at the inlet and/or outlet of the EGR passage 118, an exhaust gas pressure at the inlet and/or outlet of the EGR passage 118, a lift, duration and/or timing of an intake valve and/or an exhaust valve of cylinders 108, a speed of compressor 126, a geometry, position and/or speed of the turbine 128, a composition of induction gas and/or EGR gas, an engine speed value, an engine load, engine torque, engine power output value, an engine knock value, and/or combinations thereof. Fuel sensor(s) 146 can measure or provide a signal indicative of a rate of fuel injection, a type of fuel injected, and/or a composition of the fuel. Additionally or alternatively, an example parameter includes a rate of change or other transformation of any described parameter. The listed parameters are exemplary and non-limiting.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

In certain embodiments, the controller 140 provides a control command, and one or more components of the system 100 are responsive to the control command. The control command, in certain embodiments, includes one or more messages, and/or includes one or more parameters structured to provide instructions to the various engine components responsive to the control command. An engine component responding to the control command may follow the command, receive the command as a competing instruction with other command inputs, utilize the command as a target value or a limit value, and/or progress in a controlled manner toward a response consistent with the engine control command.

Certain systems are described in the following, and include examples of controller operations in various contexts of the present disclosure. In one embodiment shown in FIG. 2, a control scheme 200 includes engine 102 and an oxygen sensor such as oxygen sensor 142 or 148. Sensor 142, 148 provides a sensed lambda output 202 that is provided to a lambda control module 204 of controller 140, which determines a lambda control feedback correction input 208 based on the sensed lambda output and provides input 208 to the fuel control module 206. As shown in graphs 300 and 301 of FIG. 3A, if the AFRs of cylinders 108 are balanced, then the frequencies of control feedback correction input 208 and sensed lambda output 202 should be the same, although amplitude and phase may be different. As shown graphs 302 and 303 of FIG. 3B, if the cylinder AFRs are imbalanced, then only the sensed lambda includes high frequency components in the sensed signal since high frequency components of the control feedback correction input 208 are filtered out in the controller due to controller bandwidth.

Figure 2:
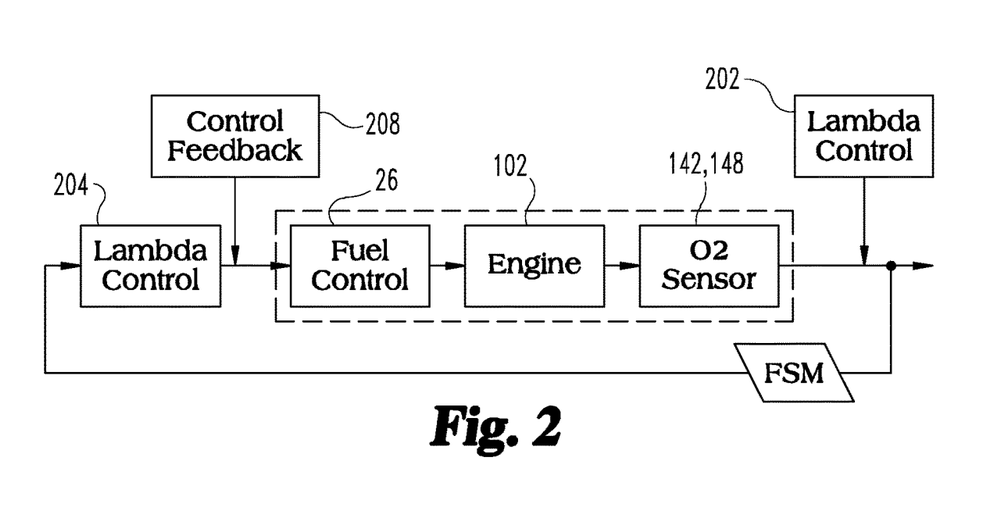
FIG. 2 is a schematic depiction of one embodiment of the control apparatus of the system of FIG. 1.
Figure 3A:
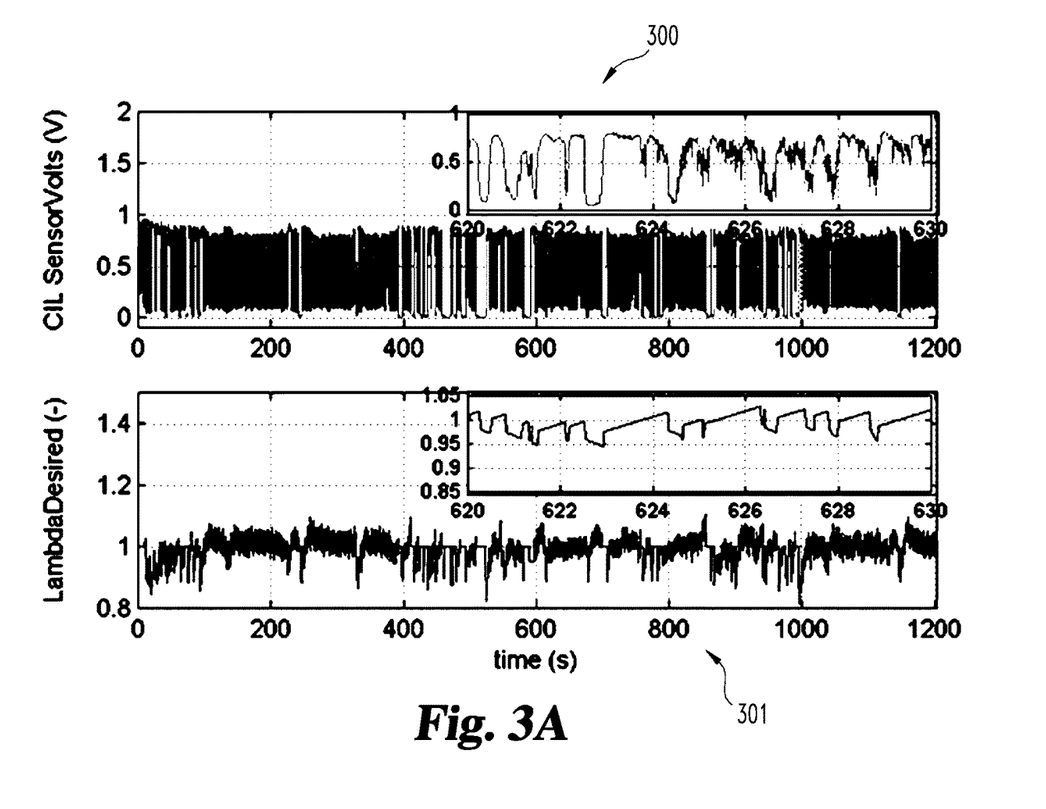
FIGS. 3A and 3B show a balanced condition and an unbalanced condition, respectively, between the sensed output lambda and the feedback control input lambda.
Figure 3B:
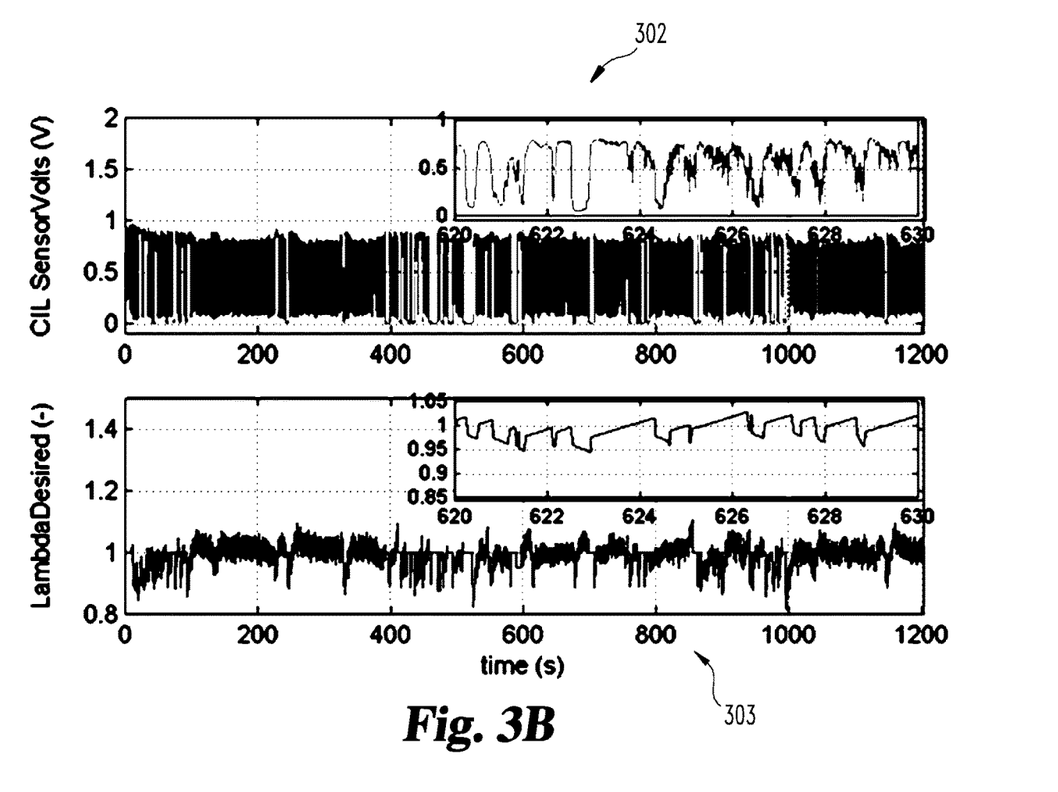

In one embodiment, an AFR imbalance diagnostic in controller 140 employs the lambda control feedback correction input 208 and sensed lambda output 202 to determine a cylinder AFR imbalance. In one embodiment, an AFR imbalance diagnostic procedure performed by controller 140 includes determining if monitoring conditions for an AFR imbalance diagnostic are met; determining the fundamental frequency of the lambda control feedback correction input 208 (controller 140 feedback) using a time domain method; determining the fundamental frequency of output lambda 202 (sensed voltage) using a time domain method; determining a monitoring parameter in response to the fundamental frequencies; comparing the monitoring parameter to a pre-defined threshold; if the monitoring parameter is greater than the pre-defined threshold, determine and/or output of an AFR imbalance fault or if not then declare an AFR imbalance pass; and repeat these steps.

In one embodiment, the enable conditions include, for example, the engine speed being greater than a threshold, the mass air flow to the engine being greater than a threshold, the oxygen sensor heater being ON, intake manifold pressure being less than a threshold, and dithering being ACTIVE. Other embodiments contemplate additional or alternative enablement conditions. These enablement conditions may also be employed for the other embodiment diagnostic procedures discussed herein. In still other embodiments, a time duration for enablement conditions being met must be greater than a threshold time duration. A sampling requirement may also be established.

In one embodiment, the monitoring parameter is a mean value of the absolute difference of the input/output lambda frequencies. For example, as shown in graphs 400 and 401 of FIG. 4A, the feedback correction input 208 may be determined by the inverse of the period of the falling edge of the frequency, and the sensed lambda output 202 may be determined by the inverse of the period of center crossing from high to low of the oxygen sensor output. The time domain method is used to estimate the fundamental frequency using mean crossing detection.

Figure 4:
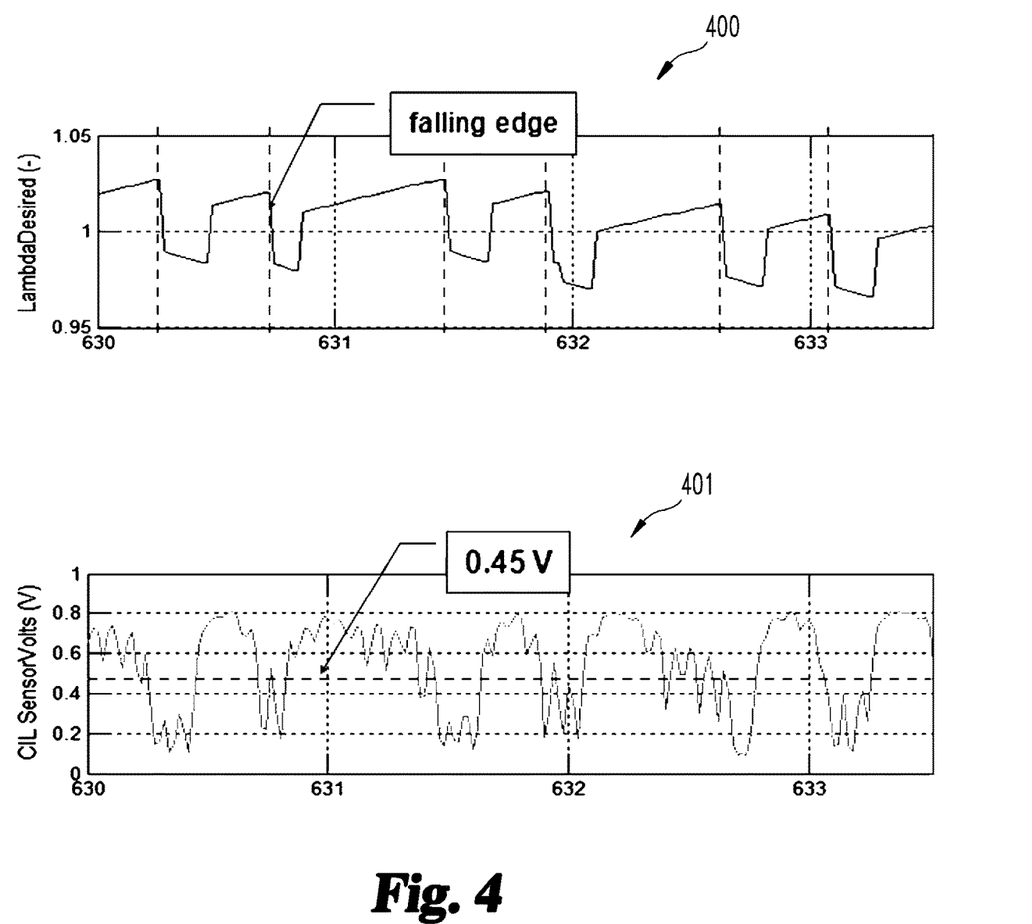
FIG. 4A shows the input/output references for feedback control input lambda and sensed output lambda and FIG. 4B shows a sensor measurement with dithering and imbalance.

Another embodiment AFR imbalance diagnostic procedure performed by controller 140 decomposes the sensor measurements from an oxygen type sensor 142 into different harmonic components as shown in FIG. 4B and as follows:

measurement: $y(t) = d(t) + x(t) + e(t)$ $$d(t) = A_{dc}(t) + A_d(t)\sin\left(\int_0^t 2\pi f_d(\tau)d\tau + \varphi_d\right)$$

Figure 5:
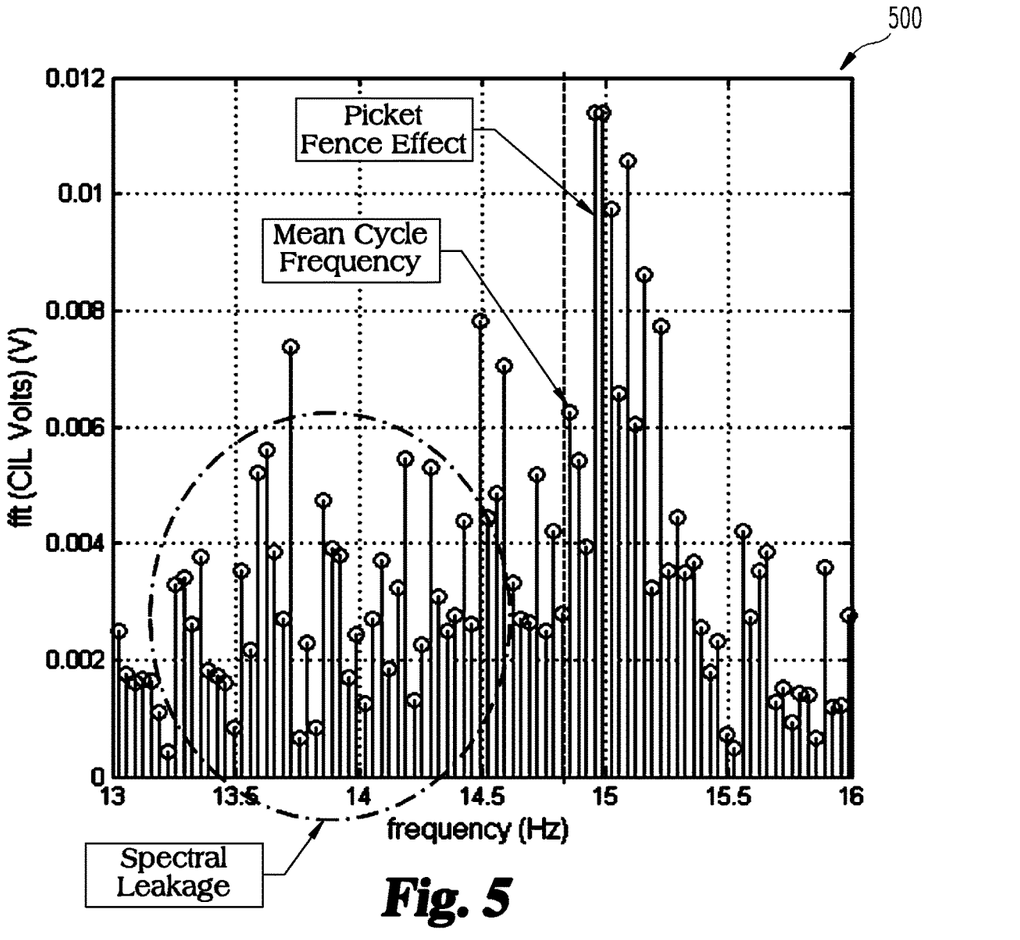
FIG. 5 is a chart of frequency versus voltage for an example operating condition of a sensor that senses the output lambda.

DC + low frequency harmonic contents (~3 Hz)

time-varying frequency and amplitude imbalance term: $x(t) = \sum_{k=1}^{n_{cyl}} A_k(t)\sin\left(\int_0^t 2\pi f_{cyc}(\tau)d\tau + \varphi_k\right)$ engine cycle frequency time-varying frequency and amplitude uncertain term: $e(t)$ unkown, may include harmonics and/or white noise The objective of this embodiment is to extract the features of x(t) from y(t) to at least estimate the amplitude or power spectral density (PSD) or, at best, estimate the exact signal x̂(t). In one embodiment, a discrete fourier transform (DFT) is used for non-parametric spectral analysis for a non-stationary signal, such as shown in a graph 500 of FIG. 5. A sliding DFT (SDFT) determines the PSD at the frequency of interest only, while a DFT determines PSD of all frequencies up to a half sampling frequency. The use of a recursive implementation of DFT (SDFT) to determine AFR imbalance can be as follows:

nominal form: $X(n, k) = (X(n-1, k) + x(n) - x(n-N))\exp\frac{j2\pi k}{N}$ input-sample at time $n: x(n)$ output-temporal PSD at time $n$ frequency $k: X(n, k)$ transfer function: $H(z, k) = \frac{(1 - x^{-N})\exp\frac{j2\pi k}{N}}{1 - \exp\frac{j2\pi k}{N}z^{-1}}$ margianlly stable → might be unstable w.r.t actual data (numerical reason, ex: round)

stable form with damping factor $r$:

$X(n, k) = \{rX(n-1, k) + x(n) - r^N x(n-N, k)\}\exp\frac{j2\pi k}{N}$ transfer function: $H(z, k) = \frac{(1 - e^N z^{-N})\exp\frac{j2\pi k}{N}}{1 - r\exp\frac{j2\pi k}{N}z^{-1}}$ In a further embodiment, a group energy (GE) concept is employed with SDFT to determine a monitoring parameter, such as a mean value of group energy around the cycle frequency, where the mean is a function of (GE(n, k(n))). GE can be defined:

Parseval's theorem: $\sum_{n=0}^{N-1}|x(n)|^2 = \frac{1}{N}\sum_{k=0}^{N-1}|X(k)|^2$ Definition: $GE(k) = \sqrt{\sum_{p=-m}^{m}|X(k+p)|^2}$ $k$: frequency index a notch filter (i.e. band-pass filter) in frequency domain GE with SDFT is:

Definition: $GE(n,k(n)) = \sqrt{\sum_{p=-m}^{m}|X(n,k(n)+p)|^2}$ k(n): time-varying cycle frequency index at time n a TV notch filter (i.e. TV band-pass filter) in time-frequency domain In one embodiment, a procedure performed by controller 140 to diagnose an AFR imbalance condition includes determining if monitoring conditions are met to enable detection of an AFR imbalance condition; filling a buffer with inputs from the signals from oxygen sensor 142 to use in the SDFT analysis; calculating the SDFT around the cycle frequency; calculating a group energy from the SDFT; determining the monitoring parameter in response to a mean value of the group energy around the cycle frequency during the monitoring period; comparing the monitoring parameter to a pre-defined threshold; if the monitoring parameter is greater than the threshold, declare a fault, otherwise declare a pass; and repeat these steps.

Figure 6:
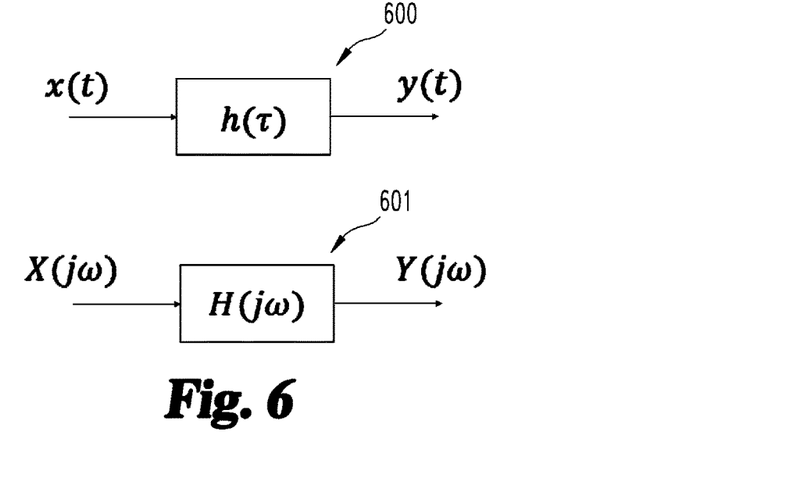
FIG. 6 is a graphical illustration of parametric spectral analysis in the time domain and in the frequency domain.

Another embodiment AFR imbalance diagnostic procedure performs a parametric spectral analysis of the sensor measurements from an oxygen type sensor 142 in the time domain and in the frequency domain as shown in blocks 600 and 601 of FIG. 6. The parametric spectral analysis is model based for a non-stationary signal with good separation between the normal and fault (AFR imbalance) operating modes. In one embodiment, the model is a time-varying auto-regressive (TV AR) model. The AR model form is as follows:

$y(n) = \sum_{k=1}^{p} a_k(n)y(n-k) + e(n)$ measured signal at time $n$: $y(n)=d(n)+x(n)+e(n)\in\Re$ model order predetermined: $p$ time-varying model parameters at time $n$: $\{a_k(n)\}_{k=1,\ldots,p}$ model error: $e(n)\in\Re$ The state space model form is:

$\bar{a}(n+1) = \bar{a}(n) + \bar{w}(n)$, $y(n) = C(n)\bar{a}(n) + e(n)$ state vector: $\bar{a}(n) = [a_1(n) a_2(n) \ldots a_p(n)]^T \in \Re^{p\times 1}$ stochastic uncertainty: $\bar{w}(n) \in \Re^{p\times 1}$ output matrix: $C(n) = [y(n-1)y(n-2) \ldots y(n-p)] \in \Re^{1\times p}$ The model parameter estimation $\bar{a}(n)$ may employ a standard Kalman filter (KF) with computation load $O(p^2)$ (cf. RLS with a forgetting factor $O(p^2)$) to estimate dithering and imbalance signals. In another embodiment, a time varying notch filter is employed to estimate dithering and imbalance signals. The tuning parameters include the constant variance of stochastic uncertainty ($V_w$) and model error ($V_e$). The time-varying power spectral density (TV PSD) of the TV AR model is:

$$Y(n, \omega_{cyc}(n)) = \left\| \frac{\sigma_e(n)}{1 - \sum_{k=1}^{p} a_k(n)\exp(-k\omega_{cyc}(n)j)} \right\|$$

time-varying standard deviation (TV STD) of model error: $\sigma_e(n)$

The disclosed procedure determines an AFR imbalance based on TV STD for TV PSD with constant STD for KF to provide robustness.

A tuning guide for $V_w$ and $V_e$ is as follows:

|  | $V_e < V_w$ | $V_e > V_w$ |
| --- | --- | --- |
| adaptability | high | low |
| model performance | good | bad |
| spectral analysis accuracy | bad | good |

The recursive STD of model error $\sigma_e(n)$ is:

|  | mean | standard deviation |
| --- | --- | --- |
| recursive update | $\overline{e}(n) = \overline{e}(n-1) + \frac{e(n) - \overline{e}(n-1)}{n}$ | $\sigma_e^2(n) = \sigma_e^2(n-1) + \overline{e}^2(n-1) - \overline{e}^2(n) + \frac{e^2(n) - \sigma_e^2(n-1) - \overline{e}^2(n-1)}{n}$ |

The monitoring metric is the mean value of the TV PSD:

$$\text{mean}(\|Y(n, \omega_{cyc}(n))\|)$$

In one embodiment, a procedure performed by controller 140 to diagnose an AFR imbalance condition includes determining if monitoring conditions are met to enable detection of an AFR imbalance condition; initializing and executing a Kalman Filter or an RLS estimator to estimate time-varying AR model coefficients from the sensor signals; determining PSD at cycle efficiency from identified model coefficients; determining a monitoring parameter from the mean value of the time-varying PSD at cycle frequency over a monitoring period; compare the monitoring parameter to a pre-defined threshold if the monitoring parameter is greater than the threshold, declare a fault, otherwise declare a pass; and repeat these steps.

In certain embodiments, controller 140 can be configured to provide a fueling command to one or more of the cylinders 108 in response to the cylinder AFR imbalance condition that reduces the AFR imbalance. As a result, the fueling amount provided to identified cylinder(s) contributing to the AFR imbalance varies from the fueling amount provided to the other cylinders 108 to correct for flow imbalances in the charge flow and injector variations, for example.

Having a balanced AFR between cylinders can improve engine performance and emission controls. Having different AFR between cylinders (cylinder imbalance) can result in higher emission, higher fuel consumption, knock, misfire, and many other practical issues. The systems, apparatus and methods disclosed herein diagnose or estimate the existence of cylinder-to-cylinder AFR variation or imbalance, and then issue a fault in response to the AFR imbalance being present.

Various aspects of the present disclosure are contemplated. According to one aspect, a method for diagnosing an AFR imbalance condition during operation of an internal combustion engine includes: determining one or more enable conditions for diagnosing the AFR imbalance condition are met; in response to one or more enable conditions being met, determining a first fundamental frequency of a lambda control feedback correction input using a time domain method; determining a second fundamental frequency of a sensed output lambda in an exhaust flow from one or more cylinders of the internal combustion engine using a time domain method; determining a monitoring parameter associated with the AFR imbalance condition in response to the first fundamental frequency and the second fundamental frequency; comparing the monitoring parameter to a pre-defined threshold; and if the monitoring parameter is greater than the pre-defined threshold, determine and/or output of an AFR imbalance fault or otherwise declare an AFR imbalance pass.

In one embodiment, the one or more enable conditions include: a speed of the internal combustion engine being greater than a speed threshold; a mass air flow to the internal combustion engine being greater than a mass air flow threshold, an oxygen sensor heater being ON, intake manifold pressure being less than a threshold, and dithering being ACTIVE. In another embodiment, the monitoring parameter is a mean value of the absolute difference between the first and second fundamental frequencies. In yet another embodiment, the first fundamental frequency is an inverse of a falling edge of the lambda control feedback correction input and the second fundamental frequency is an inverse of a period of center crossing from high to low of the sensed output lambda. In still another embodiment, the method includes controlling a fueling amount to the internal combustion engine to reduce the AFR imbalance in response to the AFR imbalance fault.

According to another aspect, a method for diagnosing an AFR imbalance condition during operation of an internal combustion engine includes: determining one or more monitoring conditions are met to enable detection of an AFR imbalance condition; in response to one or more enable conditions being met, filling a buffer with a plurality of inputs to use in a sliding discrete fourier transform (SDFT) analysis, the plurality of inputs including a sensed output lambda in an exhaust flow from one or more cylinders of the internal combustion engine; determining SDFTs at various frequency components including cycle frequency and its harmonics; determining a group energy from the determined SDFTs; determining a monitoring parameter in response to a mean value of the group energy around the cycle frequency during the monitoring period; and comparing the monitoring parameter to a pre-defined threshold and if the monitoring parameter is greater than the threshold, declare a fault relating to the AFR imbalance or otherwise declare an AFR imbalance pass.

In one embodiment, the one or more enable conditions include: a speed of the internal combustion engine being greater than a speed threshold; a mass air flow to the internal combustion engine being greater than a mass air flow threshold, an oxygen sensor heater being ON, intake manifold pressure being less than a threshold, and dithering being ACTIVE. In another embodiment, the method includes controlling a fueling amount to the internal combustion engine to reduce the AFR imbalance in response to the fault.

According to another aspect, a method for diagnosing an AFR imbalance condition during operation of an internal combustion engine includes determining if one or more monitoring conditions are met to enable detection of an AFR imbalance condition; initializing and executing a Kalman Filter or an RLS estimator to estimate time-varying auto-regressive (TV AR) model coefficients; determining a power spectral density (PSD) at cycle frequency from identified (TV AR) model coefficients; determining a monitoring parameter from a mean value of the time-varying PSD at cycle frequency over a monitoring period; and comparing the monitoring parameter to a pre-defined threshold and in response to the monitoring parameter being greater than the threshold declare a fault.

In one embodiment, the one or more enable conditions include: a speed of the internal combustion engine being greater than a speed threshold; a mass air flow to the internal combustion engine being greater than a mass air flow threshold, an oxygen sensor heater being ON, intake manifold pressure being less than a threshold, and dithering being ACTIVE. In another embodiment, the method includes controlling a fueling amount to the internal combustion engine to reduce the AFR imbalance in response to the fault.

In another aspect, a method for diagnosing an AFR imbalance condition during operation of an internal combustion engine includes: determining if one or more monitoring conditions are met to enable detection of an AFR imbalance condition; determining a monitoring parameter based on a sensed lambda output from an oxygen sensor measuring an exhaust oxygen of the internal combustion engine; and comparing the monitoring parameter to a pre-defined threshold and in response to the monitoring parameter being greater than the threshold declare a fault.

In one embodiment, the method includes controlling a fueling amount to the internal combustion engine to reduce the AFR imbalance in response to the fault.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for diagnosing an air-fuel ratio (AFR) imbalance condition during operation of an internal combustion engine, comprising:
    determining one or more enable conditions for diagnosing the AFR imbalance condition are met;
    in response to one or more enable conditions being met, determining a first fundamental frequency of a lambda control feedback correction input using a time domain method;
    determining a second fundamental frequency of a sensed output lambda in an exhaust flow from one or more cylinders of the internal combustion engine using a time domain method;
    determining a monitoring parameter associated with the AFR imbalance condition in response to the first fundamental frequency and the second fundamental frequency;
    comparing the monitoring parameter to a pre-defined threshold; and
    if the monitoring parameter is greater than the pre-defined threshold, determine and/or output of an AFR imbalance fault or otherwise declare an AFR imbalance pass.

2. The method of claim 1, wherein the one or more enable conditions include: a speed of the internal combustion engine being greater than a speed threshold; a mass air flow to the internal combustion engine being greater than a mass air flow threshold, an oxygen sensor heater being ON, intake manifold pressure being less than a threshold, and dithering being ACTIVE.

3. The method of claim 1, wherein the monitoring parameter is a mean value of the absolute difference between the first and second fundamental frequencies.

4. The method of claim 1, wherein the first fundamental frequency is an inverse of a falling edge of the lambda control feedback correction input; and
    wherein the second fundamental frequency is an inverse of a period of center crossing from high to low of the sensed output lambda.

5. The method of claim 1, further comprising controlling a fueling amount to the internal combustion engine to reduce the AFR imbalance in response to the AFR imbalance fault.

6. A method for diagnosing an air-fuel ratio (AFR) imbalance condition during operation of an internal combustion engine, comprising:
    determining if one or more monitoring conditions are met to enable detection of an AFR imbalance condition;
    initializing and executing a Kalman Filter or an RLS estimator to estimate time-varying auto-regressive model coefficients;
    determining a power spectral density (PSD) at cycle frequency from identified time-varying auto-regressive model coefficients;
    determining a monitoring parameter from a mean value of the time-varying PSD at cycle frequency over a monitoring period; and
    comparing the monitoring parameter to a pre-defined threshold and in response to the monitoring parameter being greater than the threshold declare a fault.

7. The method of claim 6, wherein the one or more enable conditions include: a speed of the internal combustion engine being greater than a speed threshold; a mass air flow to the internal combustion engine being greater than a mass air flow threshold, an oxygen sensor heater being ON, intake manifold pressure being less than a threshold, and dithering being ACTIVE.

8. The method of claim 6, further comprising controlling a fueling amount to the internal combustion engine to reduce the AFR imbalance in response to the fault.

9. A method for diagnosing an air-fuel ratio (AFR) imbalance condition during operation of an internal combustion engine, comprising:
    determining if one or more monitoring conditions are met to enable detection of an AFR imbalance condition;
    determining a monitoring parameter based on a sensed lambda output from an oxygen sensor measuring an exhaust oxygen of the internal combustion engine, the monitoring parameter being determined in response to a first fundamental frequency of a lambda control feedback correction input and a second fundamental frequency of a sensed output lambda in an exhaust flow from one or more cylinders of the internal combustion engine; and comparing the monitoring parameter to a pre-defined threshold and in response to the monitoring parameter being greater than the threshold declare a fault.

10. The method of claim 9, further comprising controlling a fueling amount to the internal combustion engine to reduce the AFR imbalance in response to the fault.

11. An electronic control apparatus for diagnosing an air-fuel ratio (AFR) imbalance condition during operation of an internal combustion engine, comprising:
an electronic controller configured to:
determine whether one or more enable conditions for diagnosing the AFR imbalance condition are met;
in response to one or more enable conditions being met, determine in a time domain a first fundamental frequency of a lambda control feedback correction input;
determine in the time domain a second fundamental frequency of a sensed output lambda in an exhaust flow from one or more cylinders of the internal combustion engine;
determine a monitoring parameter associated with the AFR imbalance condition in response to the first fundamental frequency and the second fundamental frequency;
compare the monitoring parameter to a pre-defined threshold; and
if the monitoring parameter is greater than the pre-defined threshold, determine and/or output of an AFR imbalance fault or otherwise declare an AFR imbalance pass.

12. The system of claim 11, wherein the one or more enable conditions include: a speed of the internal combustion engine being greater than a speed threshold; a mass air flow to the internal combustion engine being greater than a mass air flow threshold, an oxygen sensor heater being ON, intake manifold pressure being less than a threshold, and dithering being ACTIVE.

13. The system of claim 11, wherein the monitoring parameter is a mean value of the absolute difference between the first and second fundamental frequencies.

14. The system of claim 11, wherein the first fundamental frequency is an inverse of a falling edge of the lambda control feedback correction input; and
wherein the second fundamental frequency is an inverse of a period of center crossing from high to low of the sensed output lambda.

15. The system of claim 11, wherein the electronic controller is configured to control a fueling amount to the internal combustion engine to reduce the AFR imbalance in response to the AFR imbalance fault.

* * * * *